United States Patent [19]

Noguchi

[11] Patent Number: 4,488,398

[45] Date of Patent: Dec. 18, 1984

[54] POWER PLANT INTEGRATED WITH COAL GASIFICATION

[75] Inventor: Yoshiki Noguchi, Hitachi, Japan

[73] Assignee: Hitachi, Ltd., Tokyo, Japan

[21] Appl. No.: 437,676

[22] Filed: Oct. 29, 1982

[30] Foreign Application Priority Data

Nov. 9, 1981 [JP] Japan .................. 56-178457

[51] Int. Cl.³ .............................................. F02C 3/28
[52] U.S. Cl. .................................................. 60/39.12
[58] Field of Search ................ 60/39.12, 39.02, 39.182

[56] References Cited

U.S. PATENT DOCUMENTS 4,019,314  4/1977  Springmann ...................... 60/39.12
4,250,704  2/1981  Bruckner et al. .................. 60/39.12
4,341,069  7/1982  Bell et al. ............................ 60/39.12

Primary Examiner—Louis J. Casaregola
Attorney, Agent, or Firm—Antonelli, Terry & Wands

[57] ABSTRACT

A power plant integrated with coal gasification includes an oxygen plant for separating oxygen from air and a coal gasification plant for producing a combustible gas by reaction of coal with a gasifying agent containing at least oxygen as an effective component. The combustible gas is supplied as a fuel to a gas turbine, and a portion of compressed air is bled from an air compressor for gas turbine at the outlet or at the intermediate stage of the air compressor, and divided into two portions, one of which is supplied as feed air to the oxygen plant, thus eliminating the need for a feed air compressor, and another of which is mixed with the oxygen from the oxygen plant to prepare oxygen-enriched air, which is supplied to the coal gasification plant, thus reducing the capacity of the oxygen plant.

6 Claims, 6 Drawing Figures

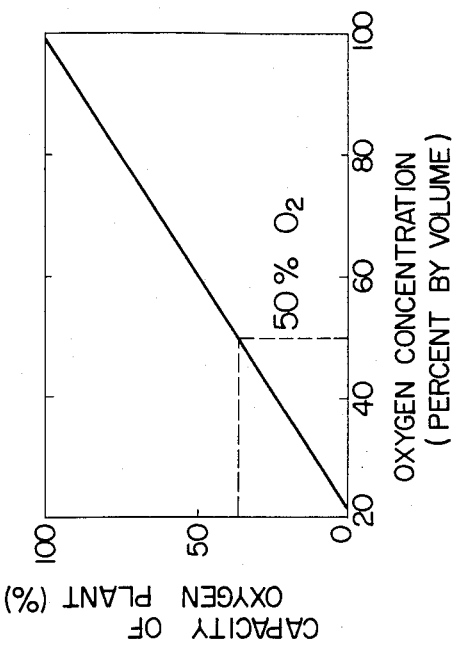
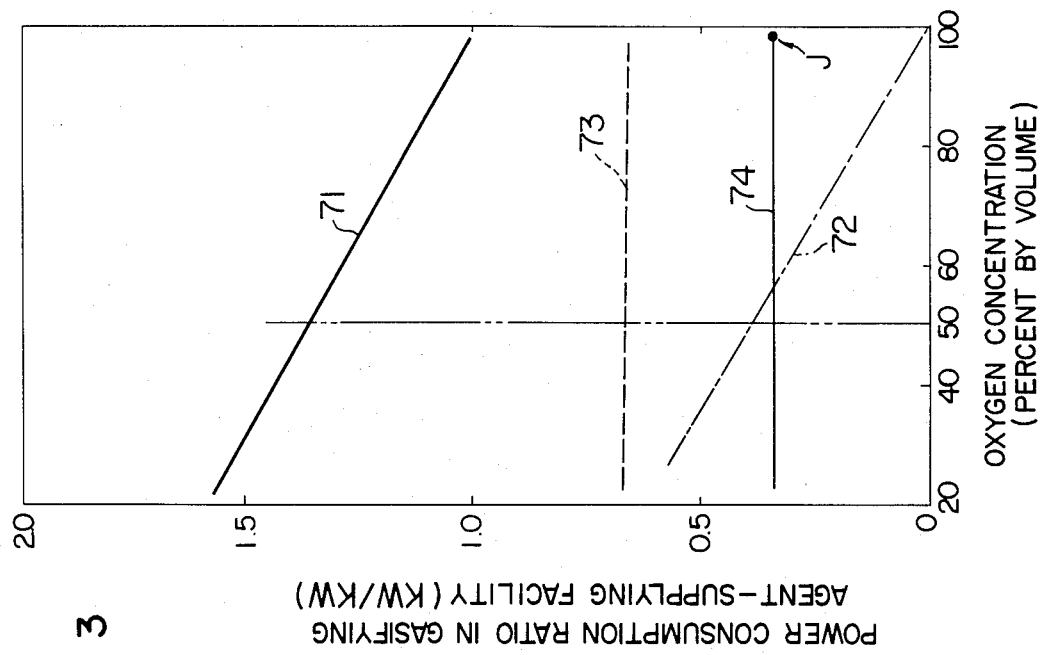

POWER PLANT INTEGRATED WITH COAL GASIFICATION

BACKGROUND OF THE INVENTION

This invention relates to a power plant integrated with coal gasification and with a gas turbine plant using a combustible gas produced from the coal gasification as a fuel, and provides a power plant integrated with an apparatus for coal gasification, which produces a combustible gas by reaction of coal with a gasifying agent containing at least oxygen as an effective component.

Coal gasification has, for example, been actually utilized in a power plant integrated with coal gasification, etc, with being oxygen or highly oxygen-enriched air is supplied to a coal gasification plant as a gasifying agent. However, consumption of the generated electric power in an auxiliary facility including an oxygen plant for producing such a gasifying agent is too large to maintain a good energy efficiency of the entire power plant, as will be become more apparent from the following description.

As shown in FIG. 1, a gasification plant 10 is integrated with a power plant 30 including a gas turbine using a combustible gas produced from the gasification plant 10 as a fuel, with the gasification plant 10 comprising a gasification furnace 11 which produces a combustible gas 2 by reaction of coal 1 with oxygen 8 as a gasifying agent together with steam 4, etc., and a cooler 12 which cools the combustible gas 2 produced in the gasification furnace 11. The combustible gas 2 thus formed is subjected to dust removal and sulfur removal in a gas purification plant 20 to obtain a fuel gas 3 for gas turbine. In the prior art, an oxygen plant 40 is used as an apparatus for supplying a gasifying agent, and produces highly oxygen-enriched air as a gasifying agent. Thus, the oxygen plant 40 must be designed to meet a desired oxygen concentration. For example, it can produce oxygen 8 with a 98% oxygen concentration, the balance being air. The oxygen plant 40 comprises a feed air compressor 41, an air separator 42 for separating oxygen from air, and an oxygen compressor for compressing the oxygen from the air separator 42. The nitrogen separated from air is utilized in other places as a by-product from the oxygen plant 40.

In addition to the oxygen plant 40, there are an air compressor 50 and a mixing drum 54 to mix the oxygen 8 with air to obtain an oxygen-enriched air 9 with a desired oxygen concentration, which is supplied to the gasification plant 10.

In the prior art construction of FIG. 1, the oxygen plant 40 consumes a considerable amount of electric power, and usually, about 13% of electric power generated in the power plant 30 is consumed in the oxygen plant 40. In the case of thermal electric power generation by firing heavy oil, etc., about 5% of the generated electric power is consumed in the auxiliary facility, and in the case of thermal electric power generation by direct firing of coal as fuel, about 8% of the generated electric power is consumed. Thus, the power consumption in the auxiliary facility is considerably larger in the thermal electric power generation using the coal gasification fuel than in the other cases, because about 15% of the generated electric power is consumed in the entire plant. Thus, it is an important task in the art of coal gasification to reduce consumption of the generated electric power in the auxiliary facility to thereby improve the energy efficiency of the entire power plant.

SUMMARY OF THE INVENTION

An object of the present invention is to provide a power plant integrated with coal gasification with a reduced capacity of an oxygen plant and a considerably reduced consumption of generated electric power in auxiliary facility including the oxygen plant, based on efficient utilization of the art of coal gasification without the disadvantages of the prior art.

The object of the present invention can be attained by bleeding a portion of compressed air from an air compressor for gas turbine using a coal gasification combustible gas as a fuel and by using the bled compressed air at least as feed air in separation of oxygen as a gasifying agent from air, whereby a feed air compressor for separation of oxygen from air can be omitted and power consumption can thereby be reduced.

Furthermore, according to the present invention, the air bled from the air compressor for gas turbine can be led to the outlet of the oxygen plant to adjust the oxygen concentration of the oxygen-enriched air to the coal gasification plant, whereby the capacity of the oxygen plant can be reduced, and also the special air compressor for adjusting the oxygen concentration can be omitted. This leads to minimization and considerable reduction of consumption of generated electric power in the auxiliary facility.

According to the present invention, the energy efficiency at the sending end of a power plant integrated with coal gasification can be considerably improved.

BRIEF DESCRIPTION OF THE DRAWINGS

FIG. 3 is a graphical illustration of power consumption characteristics;

FIG. 4 is a graphical illustration of the relationship between the oxygen concentration of oxygen-enriched air and the capacity of an oxygen plant;

DESCRIPTION OF THE PREFERRED EMBODIMENTS

Figure 2:
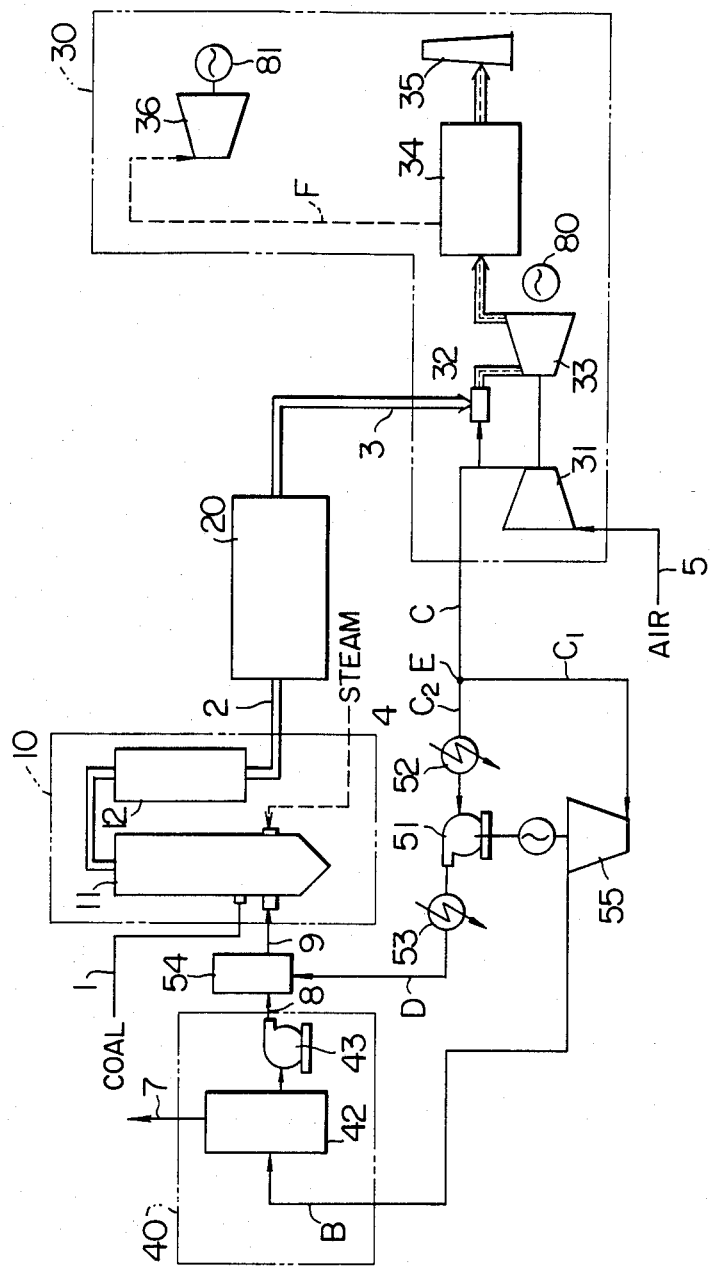
FIG. 2 is a schematic view of a power plant integrated with coal gasification according to one embodiment of the present invention.

Referring now to the drawings wherein like reference numerals are used throughout the various views to designate like parts and, more particularly, to FIG. 2. according to this figure, a power plant includes an oxygen plant 40 separating oxygen 8 from air B and a coal gasification plant 10 for producing a combustible gas 2 by reaction of coal 1 with a gasifying agent, which gasifying agent includes oxygen 8 as an essential effective component as well as steam 4. The combustible gas 2 is used as a fuel for a gas turbine 33, and compressed air C is bled from an air compressor 31 for a gas turbine 33 at the outlet or at the intermediate stage of the air compressor 31. The bled compressed air C is used as feed air B to the oxygen plant 40. Since the bled compressed air C from the air compressor 31 for the gas turbine 33 is used as feed air B, it is not necessary to provide a feed air compressor, and, consequently, power consumption in the oxygen plant 40 can be considerably reduced.

Furthermore, the compressed air C bled from the air compressor 31 for the gas turbine 33 is divided into two further portions, with one further portion $C_1$ being used as feed air B for oxygen separation, while other portion $C_2$ is used for dilution, that is, the portion $C_2$ is led to a mixing drum 54 as dilution air D and mixed with the oxygen 8 from the oxygen plant 40 to obtain oxygen-enriched air 9 with a desired oxygen concentration, which is supplied to the coal gasification plant 10.

The power plant integrated with coal gasification includes a coal gasification plant 10 comprising a coal gasification furnace 11 for producing a combustible gasification gas 2 by reaction of coal 1 with a gasifying agent such as oxygen-enriched air 9 together with steam 4, etc. and a gas cooler 12 for cooling the resulting hot combustible gas 2, a gas purification plant 20 for purifying the combustible gas 2 into a fuel gas 3 for gas turbine by dust removal and sulfur removal, a power plant 30 including a gas turbine unit, and an oxygen plant 40 for separating oxygen from the feed air B and for supplying the oxygen to the coal gasification plant 10. The oxygen plant 40 comprises an air separator 42 for separating oxygen from air and an oxygen compressor 43 for compressing the separated oxygen.

The compressed air C bled from the air compressor 31 for gas turbine is used as the feed air B for the oxygen plant 40 by dividing the compressed air C into the two further portions $C_1$, $C_2$ at point E an appropriate means, with the one further $C_1$ being led to an expansion turbine 55 to lower both pressure and temperature, while recovering power, and the air from the turbine 55 being led to the air separator 42 as the feed air B.

On the other hand, the other further portion $C_2$ is led to an air compressor 51 to elevate pressure, and then to the mixing drum 54, with heat exchangers 52 and 53 being provided at the upstream and downstream side of the air compressor 51 to cool the compressed air. The air compressor 51 is also integrally connected to the expansion turbine 55, and driven by the recovered power from the turbine 55. The mixing drum 54 receives the cooled portion of air $C_2$ as dilution air D, and mixes the oxygen 8 from the oxygen compressor 43 with the dilution air D to prepare oxygen-enriched air 9 with a desired oxygen concentration which is supplied to the coal gasification plant 10.

The gas turbine includes a combuster 32 for mixing the combustible gas 3 with the air from the compressor 31 and combusting the mixture, with a resulting combustion gas being led to a gas turbine 33 to drive a generator 80 and a compressor 31 to generate power. The exhaust gas from the gas turbine 33 is led to a waste heat recovery boiler 34 to generate steam by the heat of the exhaust gas, and then to a stack 35. The steam E from the boiler 34 is used as a work source for a steam turbine 36 to drive a generator 81. A portion of the steam F is used also as feed steam 4 for the coal gasification plant 10.

According to the present invention, the feed air compressor 41, provided in the conventional oxygen plant, can be omitted, and all or a portion of the power for the air compressor 51 is driven by the power recovered from the air bled from the air compressor 31 for gas turbine by the expansion turbine 55. Furthermore, it is also possible to eliminate the air compressor in FIG. 1 can be omitted, with a combined effect being a reduction in capacity of the oxygen plant and reduction in consumption of power in the auxiliary facility, and especially a remarkable reduction in consumption of power in the auxiliary facility.

For example, when the oxygen concentration of oxygen-enriched air 9 is 50%, the invention has the following effects.

To obtain oxygen-enriched air 9 with 50% oxygen concentration, when the purity of oxygen 8 from the oxygen compressor 43 is, for example, 98%, the flow ratio by volume in terms of the normal state of oxygen 8, dilution air D and feed air B can be calculated, since the atmospheric air contains about 21% by volume of oxygen. That is, the flow ratio by volume in terms of the normal state of oxygen 8 with 98% purity from the oxygen compressor 43: dilution air D from the air compressor 51: feed air B from the expansion turbine 55 is approximately 0.16: 0.26: 0.74, when the volume of compressed air at the outlet of the air compressor 31 for gas turbine is presumed to be 1.0, that is, the sum total of volumes of dilution D and feed air B is presumed to be 1.0 in term of the normal state.

When the compressed air at the outlet of the air compressor 31 for gas turbine is, for example, at 10 atmospheres and 350° C., which are usual for the compressed air for gas turbine, in that case, power of about 1.018 kW/Nm$^3$ can be recovered from the bled compressed air C in the expansion turbine 55 by reducing the pressure to 5 atmospheres and by leading the expanded air as feed air B to the air separator 42. On the other hand, the dilution air D as a bled compressed air is subjected to pressure elevation to, for example, 28 atmospheres in the air compressor 51 and to cooling nearly to the room temperature in the heat exchanger 53, and then led to the mixing drum 54, while consuming power of about 0.04 kW/Nm$^3$. On the other hand, the oxygen compressor 43 consumes power of about 0.2 kW/Nm$^3$ to compress the oxygen 8 from the atmospheric pressure to, for example, 28 atmospheres to lead it to the mixing drum 54.

Figure 1:
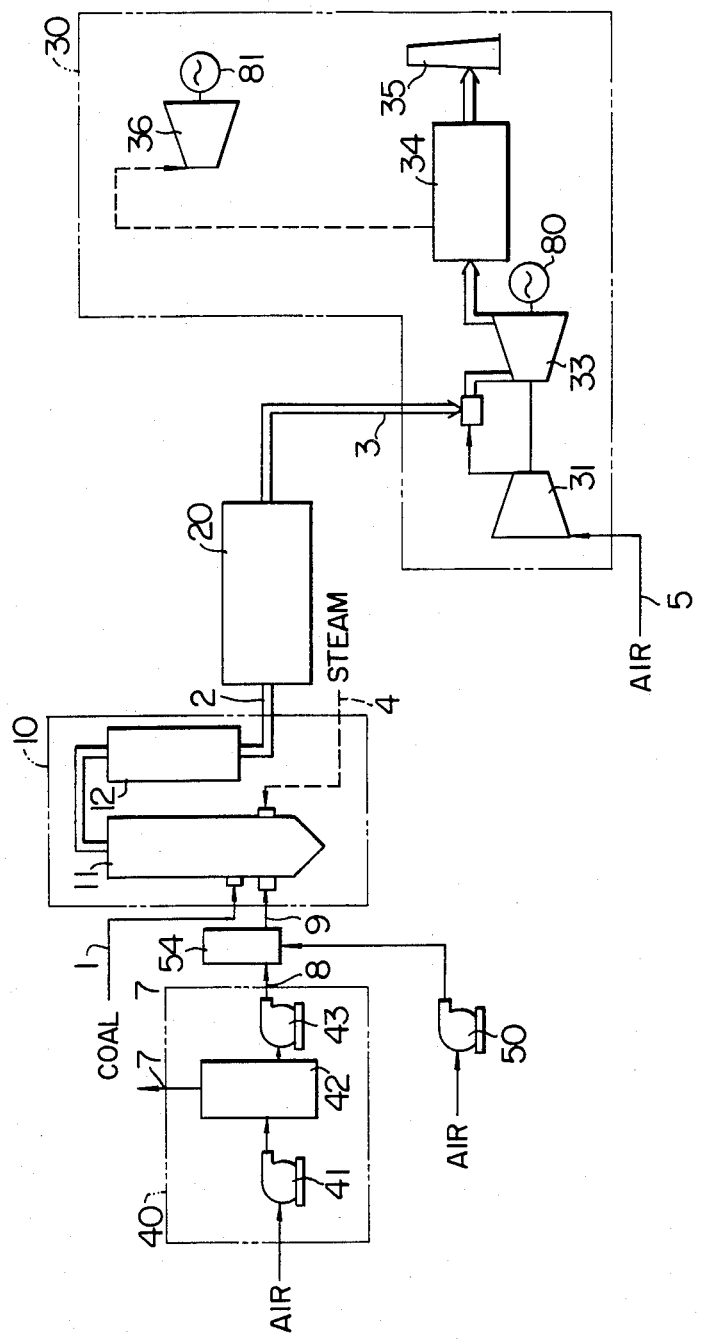
FIG. 1 a schematic view of a power plant integrated with coal gasification according to the prior art.

According to the present embodiment, the feed air compressor 41 in FIG. 1 can be omitted, and the power for for the compressor 41 can be correspondingly saved. Thus, when the power for the feed air compressor 41 is presumed to be about 0.09 kW/Nm$^3$ as usual in the prior art, the sum total of this power and the power recovered in the expansion turbine 55, that is, about 0.018 kW/Nm$^3$, in other words, sum total of 0.108 kW/Nm$^3$, can be saved according to the present invention, as compared with the prior art. As a result, the total power consumption of oxygen compressor 43, air compressor 51 and expansion turbine 55 can be reduced to more than one-half of the power required in the prior art, when the flow ratio is taken into account.

FIG. 3 graphically depicts the relationship between the oxygen concentration (% by volume) of oxygen enriched air 9 to the coal gasification plant 10 as a gasifying agent and power consumption ratio in the oxygen plant, when a predetermined volume of oxygen is supplied to the coal gasification plant 10, where the oxygen concentration of air 9 in the range of 21% to 98% by volume to the coal gasification plant is plotted along the abscissa, and the power consumption ratio of a gasifying agent supplying facility including the oxygen plant 40 is plotted along the axis of the axis of ordinate. The power consumption ratio is based on the total of power consumption of feed air compressor 41, oxygen compressor 43 and air compressor 50 of the prior art shown in FIG. 1 using oxygen with 98% oxygen purity as a gasifying agent being 1.0. In FIG. 3, the line 74 shows a power consumption ratio according to the embodiment shown in FIG. 2, whereas the line 71 is a power consumption ratio according to the prior art shown in FIG. 1. The line 72 is a power consumption ratio of air compressor 50, the line 73 a power consumption ratio of feed air compressor 41, and the line 74 a power consumption ratio of oxygen compressor 43. The line 71 of the prior art power consumption ratio is shown by sum total of the lines 72, 73 and 74, whereas the power consumption ratio line of the present embodiment is in substantial agreement with the power consumption ratio line 74 of oxygen compressor 43, and is substantially constant at any oxygen concentration. The power consumption ratio lines of feed air compressor 41 and oxygen compressor 43 are substantially constant at any oxygen concentration, because the volume of oxygen to be supplied to the coal gasification plant is constant for any oxygen concentration, that is, a larger volume of air is supplied in the case of a low oxygen concentration to control the feed air make the volume of oxygen contained therein constant. Since the oxygen concentration of the oxygen separated in air separator 42 is kept constant at 98%, the volume of oxygen to be compressed in the oxygen compressor 43 is constant. Since the volume of feed air to the air separator 42 is also constant, the power consumption of feed air compressor 41 is constant. Thus, only the power consumption of air compressor 50 is changed with oxygen concentration. That is, a lower oxygen concentration means a larger volume of dilution air, that is, higher power consumption.

In FIG. 3, the power consumption ratio line according to the present embodiment is in substantial agreement with the line 74, because reduction in turbine plant efficiency is negligibly small when a portion of the compressed air is bled from the air compressor 31 for gas turbine to use feed air and dilution air in the oxygen plant 40, as will be described in detail below.

An axial, multistage compressor is usually used in a gas turbine plant and has a better efficiency than the compressors 41 and 50 separately provided as shown in FIG. 1. In the prior art, a prime mover such as a motor, etc. is used to drive the compressors 41 and 50, and is driven by the electric energy produced by the gas turbine plant, where the rotating energy of a gas turbine is converted to electric energy by the generator 50 and the electric energy is converted to a rotating energy by the motor, etc., and thus much energy loss appears at the energy conversion, thereby lowering the energy efficiency of the entire power plant including the coal gasification plant.

According to calculations, the reduction in power generated in a gas turbine plant is about 2% when about 15% of the compressed air from the compressor 31 is supplied to the coal gasification plant with an oxygen concentration of 50%, whereas, the power consumption in the entire power plant is reduced from the conventional 15% to about 8%.

On the other hand, it is apparent from FIG. 3 that the power comsumption is less with increasing oxygen concentration in the prior art, but there is a limit to the capacity of an oxygen plant 40, as will be discussed more fully below.

FIG. 4 graphically depicts the relationship between the oxygen concentration and the capacity of an oxygen plant, where the oxygen concentration is shown by % by volume and the capacity of an oxygen plant 40 is shown by %, while presuming a capacity for 100% oxygen (actually about 98%) to be 100%. As is apparent from FIG. 4 that when oxygen-enriched air 9 is used in place of pure oxygen, the capacity of an oxygen plant 40 can be made smaller. For example, when 50% oxygen-enriched air 9 is used as a gasifying agent in the plant 40 of FIG. 1, the capacity of an oxygen plant 40 can be reduced to about 40%.

When the oxygen concentration is made too low to reduce the capacity of an oxygen plant 40 and to reduce the power consumption, a function of a gasifying agent is lowered, so that a fuel gas with the desired heating value cannot be produced.

Figure 5:
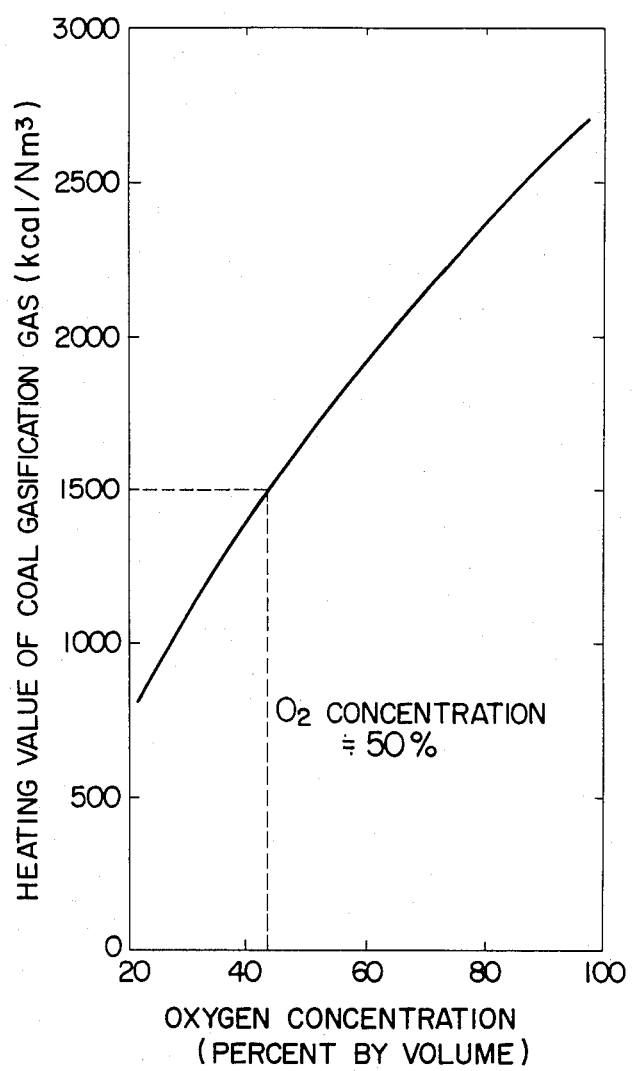
FIG. 5 is a graphical illustration of the relationship between the oxygen concentration of oxygen-enriched air and the heating value of coal gasification gas.

FIG. 5 graphically depicts the relationship between the heating value of a fuel gas and the oxygen concentration of oxygen-enriched air 9 for coal gasification to produce a fuel gas stable combustion for driving a gas turbine, where the heating value in Kcal/Nm$^3$ is given on the axis of ordinate and the oxygen concentration in % by volume is given on the axis of abscissa. The modern gas turbine combustor can operate even with a fuel gas having a heating value of 1,500 to 3,000 Kcal/Nm$^3$. As apparent from FIG. 5, a fuel gas for a gas turbine plant can be produced with oxygen-enriched gas with an oxygen concentration of at least 50% by volume.

Figure 6:
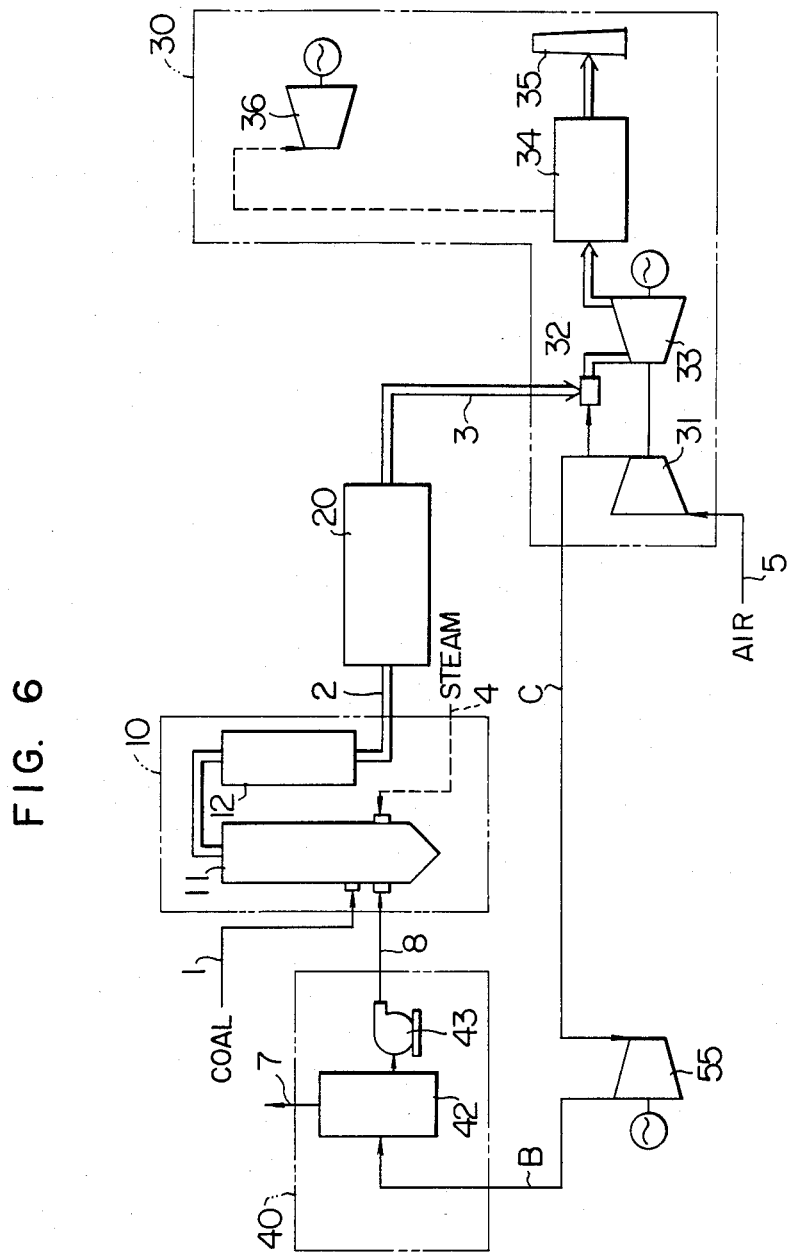
FIG. 6 is a schematic view of a power plant integrated with coal gasification according to another embodiment of the present invention.

As shown in FIG. 6, a portion of compressed air C is bled from an air compressor 31 for a gas turbine 33 at the outlet or at an intermediate stage of the air compressor 31 and led to an expansion turbine 55 without dividing the bled compressed air C into two portions to recover the power in the expansion turbine 55, and then to an air separator 42 as feed air B to an oxygen plant 10. That is, in the embodiment of FIG. 6, oxygen 8 is supplied in substantially pure state to the coal gasification plant 10 without mixing the oxygen 8 with the compressed air C bled from the air compressor 31, as in the embodiment of FIG. 2. As a result, the embodiment of FIG. 6 can be carried out with the highest oxygen concentration shown by J in FIG. 3 showing the power consumption ratio.

In the embodiment of FIG. 6, the energy efficiency cannot be improved in proportion corresponding to that attained by dilution of the oxygen concentration of the gasifying agent, but the structure is more simplified and advantageous from the viewpoint of cost, and can be provided by a simple remodelling of the conventional structure.

In the present invention, a portion of compressed air C is bled from an air compressor 31 for a gas turbine using a combustible gas from coal gasification and used at least as a feed air for separation of oxygen as a gasifying agent from air, as described above, and thus a feed air compressor 41 can be omitted in an oxygen plant 40. Furthermore, power can be recovered from the bled compressed air C in an expansion turbine 55, and thus power consumption in auxiliary facility in a gasifying agent-supplying system to a coal gasification plant can be considerably reduced, and also an energy efficiency in the entire power plant can be improved. Furthermore, the compressed air C bled from the air compressor 31 for a gas turbine can be used as a dilution air to oxygen, and oxygen-enriched air 9 can be supplied to the coal gasification plant 40, where the capacity of the oxygen plant can be effectively reduced. Through a combination of this effect with the effects mentioned above, considerable reduction in power consumption in the auxiliary facility, for example, reduction by 70–80%, can be effectively attained, as compared with the prior art. Even in the case of using pure oxygen as a gasifying agent, the feed air compressor 41 can be omitted, and thus reduction in power consumption by 30–70% can be effectively attained in the auxiliary facility.

The present invention has very distinguished effects over the prior art and thus has remarkable advantages.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

What is claimed is:

1. A power plant comprising a coal gasification plant means for producing a combustible gas by reaction of coal with a gasifying agent containing at least oxygen as an effective component, an oxygen plant means for separating oxygen from air and for supplying the gasifying agent containing separate oxygen to the coal gasification plant means, a gas turbine plant means including a gas turbine means adapted to be driven by the combustible gas from the coal gasification plant means, an air compressor means for supplying compressed air to the gas turbine means, means for bleeding a portion of compressed air from said air compressor means, means for supplying a portion of the compressed bled air as feed air to the oxygen plant means, and an air dilution supply means for supplying another portion of the bled compressed air as dilution air to a gasification agent supply means for supplying the gasification agent to the gasification plant means, including a further air compressor means for elevating the pressure of the portion of the bled compressed air supplied as dilution air, and heat exchanger means for cooling the air compressed by said further air compressor means.

2. The power plant according to claim 1, wherein the gasifying agent supply means includes a mixing drum means disposed between the oxygen plant means and the coal gasification plant means for mixing the dilution air with the gasifying agent.

3. A power plant comprising a coal gasification plant means for producing a combustible gas by reaction of coal with a gasifying agent containing at least oxygen as an effective component, an oxygen plant means for separating oxygen from air and for supplying the gasifying agent containing separated oxygen to coal gasification plant means, a gas turbine plant means including a gas turbine means adapted to be driven by the combustible gas from the coal gasification plant means, an air compressor means for supplying compressed air to the gas turbine means, means for bleeding a portion of the compressed air from said air compressor means, means for supplying the portion of the compressed bled air as feed air to the oxygen plant means, and an expansion turbine means disposed in said means for supplying the portion of compressed bled air for enabling power recovery from the compressed air bled from the air compressor means.

4. The power plant according to claim 1, wherein the further air compressor means is driven by an expansion turbine means.

5. The power plant according to claim 1, wherein the heat exchanger means includes a first and second heat exchanger respectively disposed on an upstream and a downstream side of the further air compressor means.

6. The power plant according to claim 1, wherein said oxygen plant means includes a compressor means for compressing the separated oxygen and for supplying the compressed separated oxygen to the gasification agent supply means.

* * * * *